United States Patent [19]

Vogelmann

[11] Patent Number: 5,019,687
[45] Date of Patent: May 28, 1991

[54] WELDING SYSTEM AND APPARATUS

[76] Inventor: Fritz Vogelmann, 547 Aberdeen Rd., Frankfort, Ill. 60423

[21] Appl. No.: 473,782

[22] Filed: Feb. 2, 1990

[51] Int. Cl.⁵ .............................................. B23K 9/04
[52] U.S. Cl. .............................. 219/130.1; 219/76.14
[58] Field of Search ................... 219/76.1, 76.14, 130.1

[56] References Cited

U.S. PATENT DOCUMENTS

| | | | |
|---|---|---|---|
| 3,891,821 | 6/1975 | Evertz | 219/76.1 |
| 3,934,107 | 1/1976 | Evertz | 219/76.1 |
| 3,989,918 | 11/1976 | Onarheim | 219/76.1 |
| 4,590,357 | 5/1986 | Winkler | 219/130.1 |
| 4,686,345 | 8/1987 | Oakes | 219/76.14 |

Primary Examiner—Clifford C. Shaw
Attorney, Agent, or Firm—Ernest Kettelson

[57] ABSTRACT

A welding system and apparatus comprising an elongated carbon rod about three inches in diameter and a foot or more in length laid on top of a damaged or cracked cast iron workpiece to be welded. The elongated carbon rod is spaced apart from the workpiece about two inches by insulating bricks, one end of the carbon rod having a plurality of insulated electrical conductor connected thereto, the other ends of the conductors being connected to five welding machines with each machine producing about 600 amps thereby providing approximately 3000 amps to the elongated carbon rod. A cast iron welding rod one inch or greater in diameter is placed against the carbon rod, with the tip of the welding rod placed above the crack or void in the workpiece to be welded. The cast iron welding rod serves as an electrode to create an arc between it and the workpiece at the crack or void to melt cast iron from the rod to fill and close the crack or void in the workpiece. The cast iron workpiece having the crack or void to be welded is pre-heated to approximately 1000° F. before the welding method is begun.

17 Claims, 4 Drawing Sheets

WELDING SYSTEM AND APPARATUS

BACKGROUND OF THE INVENTION

This invention relates to the field of arc welding, and in particular to welding cast iron with one inch welding rods thereby simplifying the repair of large cracks or the rebuilding of sections of a cast iron workpiece that has been chipped or worndown.

Prior art cast iron welding apparatus designs have been aimed at using smaller welding rods and using welding machines capable of providing the required amperage. No welding apparatus designs have provided for utilizing one inch welding rods and the welding machines to supply the required current in the range of 3000 amperes.

The problem with prior art cast iron welding apparatus is that they cannot from a practical standpoint repair large cracks in cast iron or rebuild large sections of a cast iron workpiece that have been worndown or broken off. It is common to replace rather than repair cast iron assemblies once they have been damaged beyond the repair capabilities of prior art welding apparatus.

Examples of prior art devices include those disclosed in the following United States Patents:

U.S. Pat. No. 4,590,357 discloses a welding apparatus that combines an alternator of a vehicle with a battery pack. A jack plus on one end of an electric holder is connectable to one of a choice of twelve inductor jacks thereby varying the current supplied to a one-quarter inch welding rod from 300 to 40 amps. One problem with this design is that it is limited to supplying a maximum current of 300 amps. The 300 amp maximum current rating cannot supply a one inch cast iron welding rod which requires approximately 3000 amps to operate. The welding apparatus described in the patent can provide enough current to a one quarter inch diameter welding rod, but a welding rod of this size is not capable of repairing large cracks or rebuilding sections of a cast iron workpiece that have been worndown or broken off.

U.S. Pat. No. 4,388,512 discloses a welding method and apparatus for use in the electronics field to weld a small diameter aluminum wire to an IC chip for example. It uses two separate power supplies, one to supply a low voltage below the threshold needed to ignite an arc between the electrode and end of an aluminum wire on which a spherical ball is to be formed, and a second power supply that provides a short impulse voltage sufficient to ignite the arc after which it cuts out letting the initial low voltage power supply maintain the arc until the spherical ball is formed at the end of the aluminum wire.

U.S. Pat. No. 3,792,225 discloses a welding system for "dip transfer" or "short circuit" welding in which two separate power supplies are used, one to provide the initial arc and the second to take over and supply increased current to the short circuit "bridge" formed by each molten drop between the electrode and work piece for a short period of time until a sensing unit senses increased resistance when the "bridge" piece begins to reduce in cross-section or "neck", at which time the second power supply cuts out.

U.S. Pat. No. 3,278,721 discloses a multi-station type of welding system power by one A.C. generator which in turn feeds three rectifier power supply units to provide three different sources of D.C. output which are connected to a common bus bar to which a distribution cable is connected to carry power to several outlet units, each of which in turn have six separate control stations for selecting different current levels to apply to a welding electrode connected thereto, such amps ranging from 50 amps output down to 10 amps output.

U.S. Pat. No. 3,059,164 discloses a A.C. supplied welding system with a D.C. converter to change the A.C. input to D.C. output for direct current welding. The patent further discloses a cooling system within the converter that varies cooling capability directly with current demand.

U.S. Pat. No. 1,684,317 discloses an early type of welding system for use with an alternating power supply in which two transformers are connected to the three phase supply line, both transformers being connected to the middle supply line conductor but one having the opposite terminal of its primary winding connected to one of the outer supply line conductors and the other transformer having its opposite primary winding terminal connected to the other one of the outer supply line conductors.

SUMMARY OF THE INVENTION

It is an object of this invention to provide a welding apparatus for arc welding cast iron.

It is an object of this invention to provide welding apparatus with a one inch or greater diameter cast iron welding rod.

It is an object of this invention to provide welding apparatus having a power source capable of supplying 3000 amps of current.

It is an object of this invention to provide an elongated carbon rod that connects to the positive terminals of the power source.

It is an object of this invention to provide insulating means to position the elongated carbon rod above the cast iron workpiece at the area to be welded.

It is an object of this invention to provide heating means to heat the cast iron workpiece to approximately 1000° F. before welding.

It is an object of this invention to weld a crack, modify an existing casting or to rebuild a section of a cast iron workpiece by positioning a one inch diameter cast iron weld rod against an elongated carbon rod connected to the positive terminals of a power source and contacting the rod to the cast iron workpiece connected to the negative terminals of a power source thereby striking an arc that melts the welding rod and the area of the work piece contacting the welding rod which allows cast iron from the weld rod to fuse to the cast iron of the workpiece.

DESCRIPTION OF PREFERRED EMBODIMENT

Figure 1:
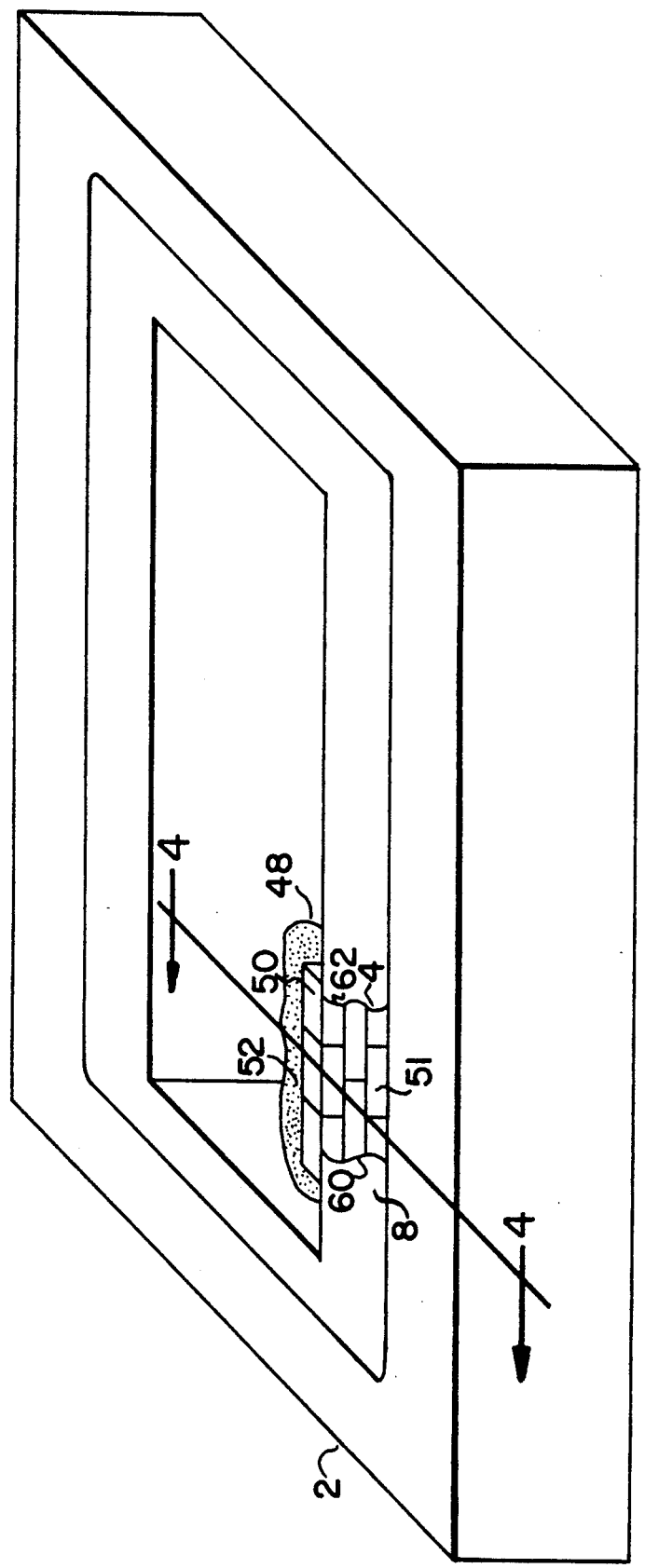
FIG. 1 is a perspective view of the welding system in accordance with this invention showing a hot top with a chipped section and a mold.
Figure 2:
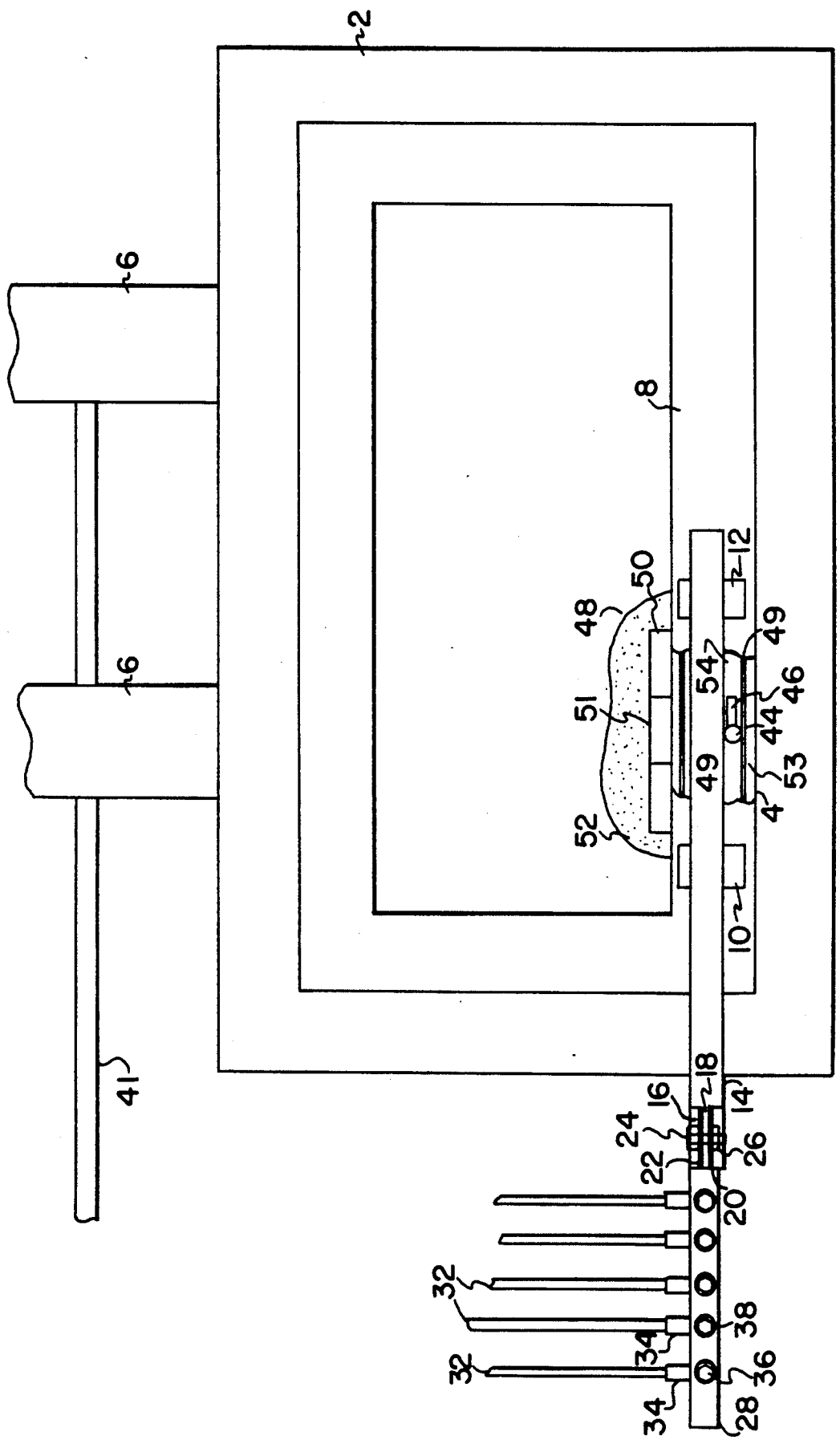
FIG. 2 is a plan view of the hot top in FIG. 1 with all electrical equipment shown excluding the welding machines.
Figure 3:
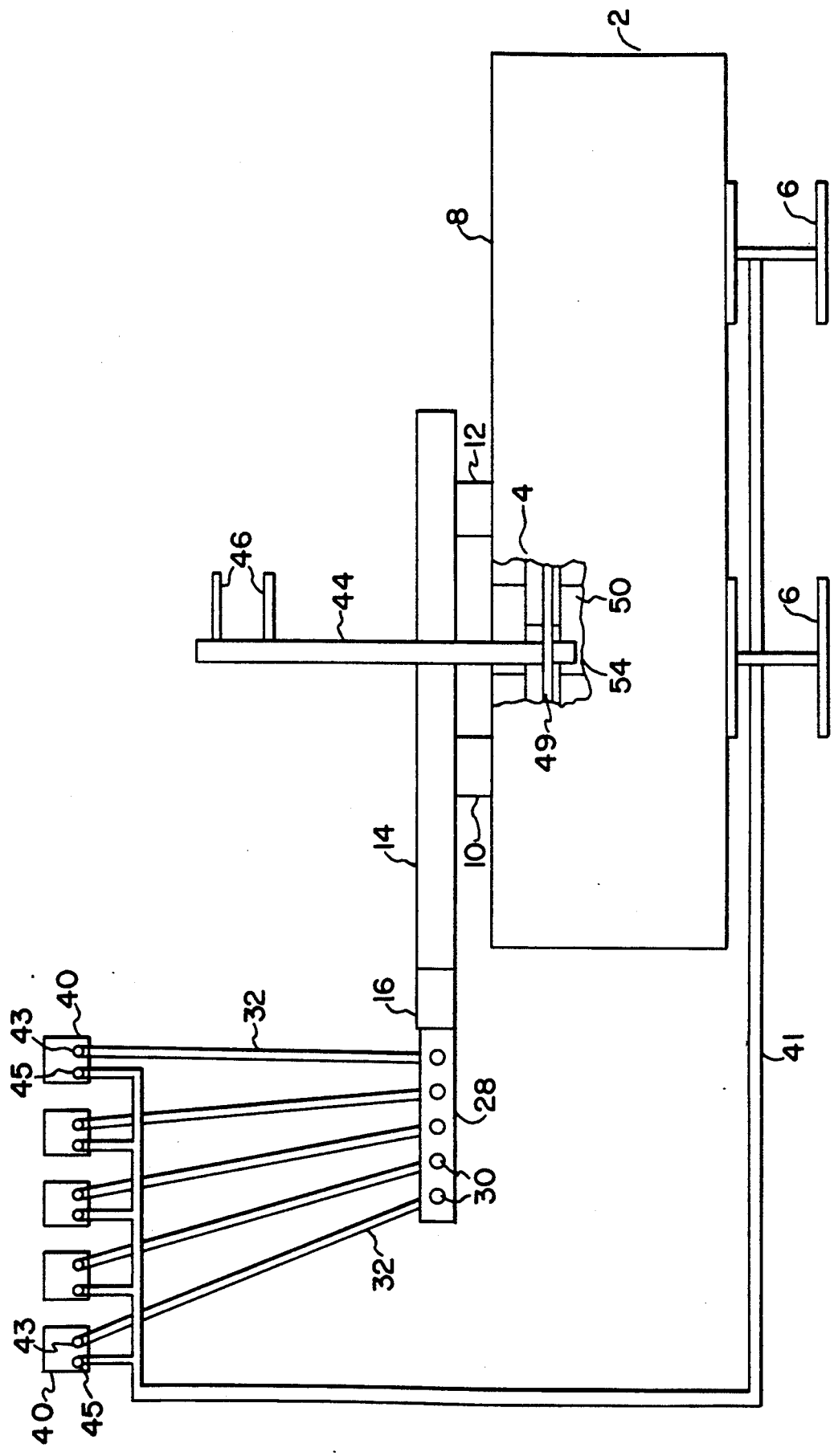
FIG. 3 is a side elevation view of the hot top in FIG. 2 with a cut away view of the chipped section, the neck extension rotated 90° and the welding machines shown.
Figure 4:
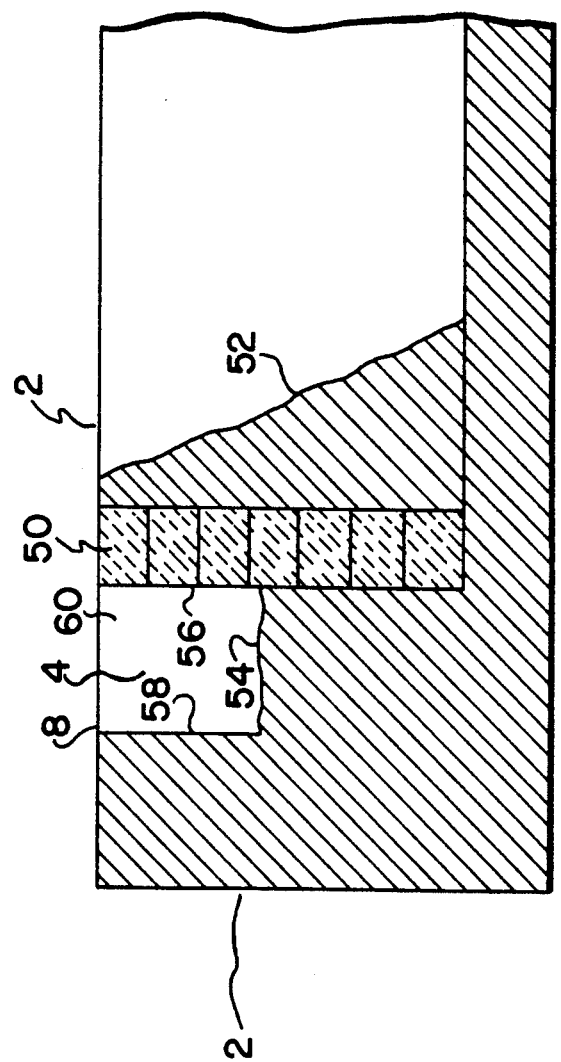
FIG. 4 is a sectional view taken on line 4—4 of FIG. 1.

A welding method and apparatus in accordance with the present invention includes a workpiece of ferrous material such as cast iron, commonly referred to as a "hot top" 2, having a cracked or chipped section to be welded. The hot top is an extension placed on an ingot mold.

The hot top 2 which is to be repaired by the welding method and apparatus in accordance with this invention sits upon two metal girders 6 at ground level with the area of the hot top 2 having the chipped section 4 forming part of the upper surface 8. A first insulating block 10 is placed on the upper surface 8 of the hot top 2 adjacent to the chipped section 4. A second insulating block 12 is placed on the upper surface 8 adjacent to the chipped section 4 and opposite to the first block 10 so that an elongated carbon rod 14 is a capable of spanning the chipped section 4 when the rod 14 is set upon the first block 10 and the second block 12. The insulating blocks 10 and 12 supporting the carbon rod 14 above the hot top 2 are electrically and thermally nonconducting and have a minimum thickness of two inches and have length and width dimension large enough to support the carbon rod 14.

The elongated carbon rod 14 is cylindrical, approximately four feet in length and three inches in diameter. The length of the carbon rod 14 may be longer or shorter than the four foot dimension mentioned above, however; a rod length of four feet seems to be the most convenient dimension to work with.

An electrically conductive clamp 16 is fastened to one end of the elongated carbon rod 14. The clamp 16 has a circular cross-section with a diameter slightly larger than the diameter of the rod 14 with an open segment forming a gap 18 to allow the clamp to slide easily upon the rod 14. The clamp 16 forms two connector lips 20 and 22 at the gap 18. The connector lips 20 and 22 each have an aperture to allow a bolt 24 to pass through the lips 20 and 22 whereupon a nut 26 is screwed on to the threaded end of the bolt 24 thereby drawing the lips together and securing the clamp 16 to the rod 14.

An electrically conductive neck extension 28 is integrally joined to the outer surface of the clamp 16. The neck extension 28 has a longitudinal dimension of approximately eight inches and a lateral dimension of approximately two inches with a cross-section having a slight arc to allow the neck extension 28 to be easily joined to the cylindrical outer surface of the clamp 16.

The neck extension 28 has five apertures 30 approximately one inch in diameter, equally spaced apart and longitudinally aligned. The neck extension 28 and clamp 16 are formed from carbon steel although other conductive materials such as copper could be utilized.

Five electrical cables 32 are connected to the neck extension 28 of the clamp 16 by utilizing crimp fittings 34 secured to one end of each of the cables 32. The crimp fitting 34 has an aperture that aligns with an aperture 30 in the neck extension 28. A separate bolt 36 passes through each of the crimp fitting apertures, one of the neck extension orifices 36, and a washer 38 whereupon a nut is screwed on the threaded end of the bolt 36 thereby securing the cable 32 to the neck extension 28 of the clamp 16.

Five welding machines 40 are utilized to supply current to the elongated carbon rod 14. Each welding machine 40 has a rated input of 460 volts A.C. and a rated output of 600 amps D.C. Each welding machine 40 has a positive terminal 43 connected to one of the five electrical cables 32 that are connected to the elongated carbon rod 14. Each welding machine 40 has a negative terminal 45 connected to a metal rod 41 that connects to two metal girders 6 located at ground level with the hot top 2 positioned upon the girders 6.

When the aforementioned connections are made, the elongated carbon rod 14 has a positive voltage polarity impressed upon it with the capability of supplying 3000 amps D.C. to the hot top 2 which has a corresponding negative voltage polarity. To complete the electrical connection, a three foot long and one inch diameter cast iron welding rod 44 manufactured from a ferrous material such as cast iron is positioned against the elongated carbon rod 14 and touched against the cast iron hot top 2 at the chipped portion 4. The hot top 2 must be preheated to approximately 1000° Fahrenheit and welding flux must be added at the welding location to insure that the weld will not crack.

The placement of the one inch diameter welding rod 44 against the chipped section 4 of the hot top 2 strikes an arc causing the rod 44 to melt and fuse with the preheated metal at the chipped section 4 thereby forming a solid cast iron weld for repair of the hot top 2. The large diameter of the rod 44 makes for quick repair of the chipped section 4 which would not be possible if a standard prior art welding rod having a three-eighths inch diameter were used together with a single welding machine 40. A handle 46 is secured to one end of the welding rod 44 to provide safety and better rod control for the individual holding the welding rod 44.

Hot tops 2 with large chipped sections 4 require a mold 48 to be formed around the chipped section 4. Carbon graphite rods 49 may be inserted inside the mold 48 to divide the chipped section 4 into smaller portions 53 thereby allowing the reconstruction process to be completed much faster. As each smaller portion 53 of the chipped section 4 is reconstructed, the respective carbon graphite rod 49 forming the smaller portion is removed. The mold 48 is formed by utilizing firebricks 50 to construct a wall 51 to retain the molten metal of the welding rod 44 within the boundaries of the chipped section 4. Sand 52 is packed around the cracks between the firebricks 50 and surrounds the wall 51 to insure that molten metal will not leak through the wall 49.

The welding process proceeds by first positioning a damaged hot top 2 on metal girders 6 with the area of the hot top 2 having the chipped section 4 forming part of the upper surface 8. Two insulating blocks 10 and 12 are positioned on opposite sides of the chipped section 4 with an elongated carbon rod 14 set upon the blocks thereby spanning the chipped section 4. Five welding machines 40 are utilized to supply approximately 3000 amps D.C. to the elongated carbon rod 14. The positive terminals 43 of the welding machines 40 are electrically connected to the elongated rod. The negative terminals 45 of the welding machines 40 are electrically connected to the two metal girders 6. A one inch diameter cast iron welding rod 44 is positioned against the elongated carbon rod 14, welding flux is set upon the area of the hot top 2 to be welded, and the welding rod 44 is then contacted to the surface area 54 of the hot top 2 to be rebuilt to reform the missing section 4. Positioning the welding rod 44 against the hot top 2 strikes an arc that melts the welding rod 44 and the contacted area of the hot top 2 which results in the two molten metals fusing together. As the metals cool and harden, a small portion of the chipped section 4 of the hot top 2 is reformed. The process is repeated until the entire chipped section 4 has been rebuilt.

The benefits of the aforementioned welding process are best visualized by referring to FIG. No.4. FIG. No. 4 is a sectional view taken on line 4—4 of FIG. 1. The chipped section 4 or gap portion of the hot top 2 has a lateral dimension of about six inches extending from the inner wall 56 of the hot top 2 to the inner wall 50 of the chipped section 4, a longitudinal dimension of about 18 inches normal to the lateral dimension and extending from the first side wall 60 of the chipped section 4 to the second side wall 62 of the chipped section 4, and a cross-sectional dimension of about six inches normal to the lateral and longitudinal dimension and extending from the upper surface 8 of the hot top 2 to the bottom surface 54 of the chipped section 4. Prior art welding apparatus and methods would not be practical to weld and fill such a large gap. The welding method and apparatus in accordance with the present invention is able to do so.

I claim:

1. A welding system to weld a gap portion in a work piece, comprising an elongated electrical conductor having a large cross-sectional dimension sufficient to conduct up to about 3000 amperes, an electrical power source able to provide up to about 3000 amperes of electrical current to said elongated electrical conductor and electronically connected thereto, said elongated electrical conductor being placed adjacent said gap portion of said workpiece, insulating means to electronically insulate said elongated electrical conductor from said workpiece, an elongated welding rod having a first end for welding and electrical contact with said gap portion of said workpiece and an opposite end for holding and manipulating said welding rod, said welding rod having an intermediate portion, said intermediate portion being positioned in electrical contact against the outer side wall of said elongated electrical conductor at any selected portion thereof between its opposite ends to supply electrical current to said welding rod and to said first end thereof, said first end being positioned in welding and electrical contact with said gap portion of said workpiece to create an operative electrical circuit between said intermediate portion of said welding rod and said workpiece, including said operative electrical circuit, an electrical arc being generated between said first end of said welding rod and said workpiece at the said gap portion thereof when electric power is supplied by said electrical power source to said elongated electrical conductor and said electrical circuit between said intermediate portion of said welding rod in contact with said elongated electrical conductor and said workpiece to melt portions of said welding rod at said first end thereof to fill and weld said gap portion of said work piece, said electrical power source having a positive terminal and a negative terminal, said operative electrical circuit being connected between said positive and negative terminals of said electrical power source to provide a non-grounded operative welding circuit, said welding rod being non-conductive between said intermediate portion and said opposite end thereof when said portion between said intermediate portion and said first end is conductive whereby a workman on the ground can hold and manipulate said portion of said welding rod between said intermediate portion and said opposite end to manually direct said first end of said welding rod as it is being melted to fill and weld said gap portion of said workpiece.

2. A welding system as set forth in claim 1, wherein said elongated electrical conductor comprises a carbon rod.

3. A welding system as set forth in claim 1, wherein said workpiece and elongated welding rod are made of cast iron.

4. A welding system as set forth in claim 1, wherein said electrical power source includes a plurality of electrical power converters with each converter having a 460 volt A.C. input and a 600 amp D.C. output.

5. A welding system as set forth in claim 4, wherein said plurality of electrical power converters includes five converters capable of supplying a current of 3000 amps D.C.

6. A welding system as set forth in claim 1, wherein said insulating means includes a plurality of blocks to support said elongated electrical conductor, said blocks being formed from an electrically insulating material.

7. A welding system as set forth in claim 1, wherein said opposite end of said welding rod includes handle means for welding personnel to hold and manipulate said welding rod with said handle means fabricated from electrical and thermal insulating material.

8. A welding system as set forth in claim 1, wherein said intermediate portion of said welding rod includes a surface area and a cross-section sufficient to conduct up to about 3000 amperes.

9. A welding system as set forth in claim 1, wherein said first end of said welding rod includes a cross-section sufficient to conduct up to about 3000 amperes.

10. A welding system as set forth in claim 1, wherein said workpiece comprises a hot top extension of an ingot mold having a missing section to be fabricated from melted welding rods and dividing means to divide said missing section fabricated from melted welding rods.

11. A welding system as set forth in claim 10, wherein said hot top extension of an ingot mold and said welding rods are manufactured from a ferrous material.

12. A welding system as set forth in claim 10, wherein said dividing means includes a plurality of carbon graphite rods installed in said missing section.

13. A welding apparatus as set forth in claim 1, including a said workpiece having a said gap portion therein to be welded, wherein said gap portion has a lateral dimension extending in a first direction, a longitudinal dimension extending in a second direction normal to said first direction and a cross-sectional dimension extending in a third direction normal to both said first and second directions, wherein said elongated welding rod is cylindrical having a cross-sectional diameter great enough to carry substantially about 3000 amperes of electrical current, each of said lateral, longitudinal and cross-sectional dimensions of said gap portion being at least as great as said cross-sectional diameter of said elongated welding rod.

14. A welding apparatus as set forth in claim 13, wherein said lateral dimension extending in a first direction measures substantially about six inches.

15. A welding apparatus as set forth in claim 13, wherein said longitudinal dimension extending in a second direction normal to said first direction measures substantially about eighteen inches.

16. A welding apparatus as set forth in claim 13, wherein said cross-sectional dimension extending in a third direction normal to both said first and second directions measures substantially about six inches.

17. A welding apparatus as set forth in claim 1, wherein said cross-section of said welding rod is not less than substantially one inch in diameter.

* * * * *